United States Patent [19]

Zambrano, Jr.

[11] 4,028,041

[45] June 7, 1977

[54] POTTER'S WHEEL

[75] Inventor: Nobile Zambrano, Jr., Branford, Conn.

[73] Assignee: Gabriel Industries, Inc., New York, N.Y.

[22] Filed: May 4, 1976

[21] Appl. No.: 683,438

[52] U.S. Cl. .................................. 425/459; 74/207

[51] Int. Cl.² ........................ B28B 1/02; F16H 13/08

[58] Field of Search .................. 425/459, 263–268; 74/207

[56] References Cited

UNITED STATES PATENTS

| | | | |
|---|---|---|---|
| 2,481,073 | 9/1949 | Brock | 425/459 X |
| 2,638,653 | 5/1953 | Adams | 425/265 X |
| 2,670,645 | 3/1954 | Pipper | 425/268 |

*Primary Examiner*—Francis S. Husar
*Assistant Examiner*—John S. Brown
*Attorney, Agent, or Firm*—Seidel, Gonda & Goldhammer

[57] ABSTRACT

A compact, washable potter's wheel comprising three separate units, a casing, a motor housing and a turntable assembly. The motor housing and turntable assembly are removably mounted on the casing. A motor is mounted within the housing and has a shaft projecting outwardly therefrom. The turntable assembly includes a turntable having a peripheral rim and a bearing assembly which rotatably supports the turntable. A leaf spring secured to the motor housing contacts a wall of the casing to urge the housing to a first position in which the motor shaft contacts the turntable rim. In this position, the turntable is driven by the motor. A cam member mounted on the motor housing slideably engages the casing wall to urge the housing to a second position in which the motor shaft is spaced apart from the turntable rim. In this position, the turntable may be manually rotated as a lazy susan.

8 Claims, 4 Drawing Figures

POTTER'S WHEEL

BACKGROUND OF THE INVENTION

The present invention relates to a potter's wheel for working clay or other material. In particular, the invention is directed to a compact washable potter's wheel comprising three separable units, a casing, a motor housing and a turntable assembly, which are water and dust resistant.

Turntables used in record players may include an annular flywheel rollably supported by a plurality of ball bearings seated at fixed positions along an annular raceway. The raceway, bearings and flywheel are immersed in a viscous fluid such as oil so that relative motion of the flywheel with respect to the raceway damps out irregular rotation of the turntable. Such a turntable is described in U.S. Pat. No. 2,113,390 entitled "Phonographic Apparatus". The flywheel comprises a heavy metal ring made of cast iron, steel or the like.

The turntable is provided with an annular trough filled with the viscous fluid, and the raceway, bearings and flywheel are immersed therein. An annular cover plate is required to seal the trough.

It is known to pivotably mount a motor drive unit on a record player casing as described in U.S. Pat. No. 1,269,752 entitled "Driving Mechanism". A leaf spring coupled to the casing biases the motor in a vertical position in which the motor shaft engages the rim of a turntable. The motor is bolted to the record player casing and is a permanent part thereof.

Heavy and relatively complicated turntable structures are unsuitable for use in a relatively inexpensive, portable potter's wheel. The components of such a potter's wheel should be as light as possible and should be made of water and dust resistant material.

The components of a portable potter's wheel should also be separable to facilitate cleaning the components. In particular, the motor or drive means should be removable from the overall configuration so that clay or dirt can be easily removed from the periphery of the motor shaft.

BRIEF SUMMARY OF THE INVENTION

A potter's wheel, comprising a casing and a turntable assembly removably mounted on the casing. The turntable assembly includes a turntable having a peripheral rim and a bearing assembly disposed beneath the turntable. The turntable is rotatably mounted on the casing and is rotatably coupled to the bearing assembly for removal of the turntable and bearing assembly from the casing as a single unit. A motor having a shaft is mounted within a motor housing so that the shaft projects outwardly from the housing. The housing is mounted on the casing for reciprocating movement thereon. Means are operatively associated with the motor housing and the casing for displacing the motor housing in a first direction to cause the motor shaft to rollably engage the turntable rim and in a second direction to cause the shaft to disengage the rim.

An advantage of the present invention is that it comprises three separable components each of which can be easily cleaned or washed.

Another advantage of the invention is that it is dust and water resistant.

A further advantage of the invention is that it is lightweight, compact and portable.

Other advantages appear hereinafter.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
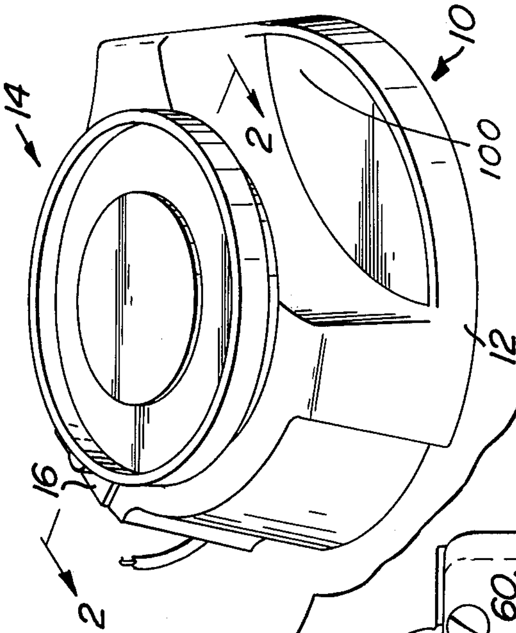
FIG. 1 is a perspective view of a potter's wheel constructed in accordance with the principles of the present invention.

Referring to the drawings in detail, wherein like numerals indicate like elements, there is shown in FIG. 1 a compact, washable potter's wheel constructed in accordance with the principles of the present invention designated generally as 10.

The potter's wheel 10 includes a casing 12, a turntable assembly 14 rotatably mounted thereon, and a motor housing 16 mounted for reciprocating movement on the casing. The turntable assembly 14 and motor housing 16 are removable from the casing as separate units.

Figure 2:
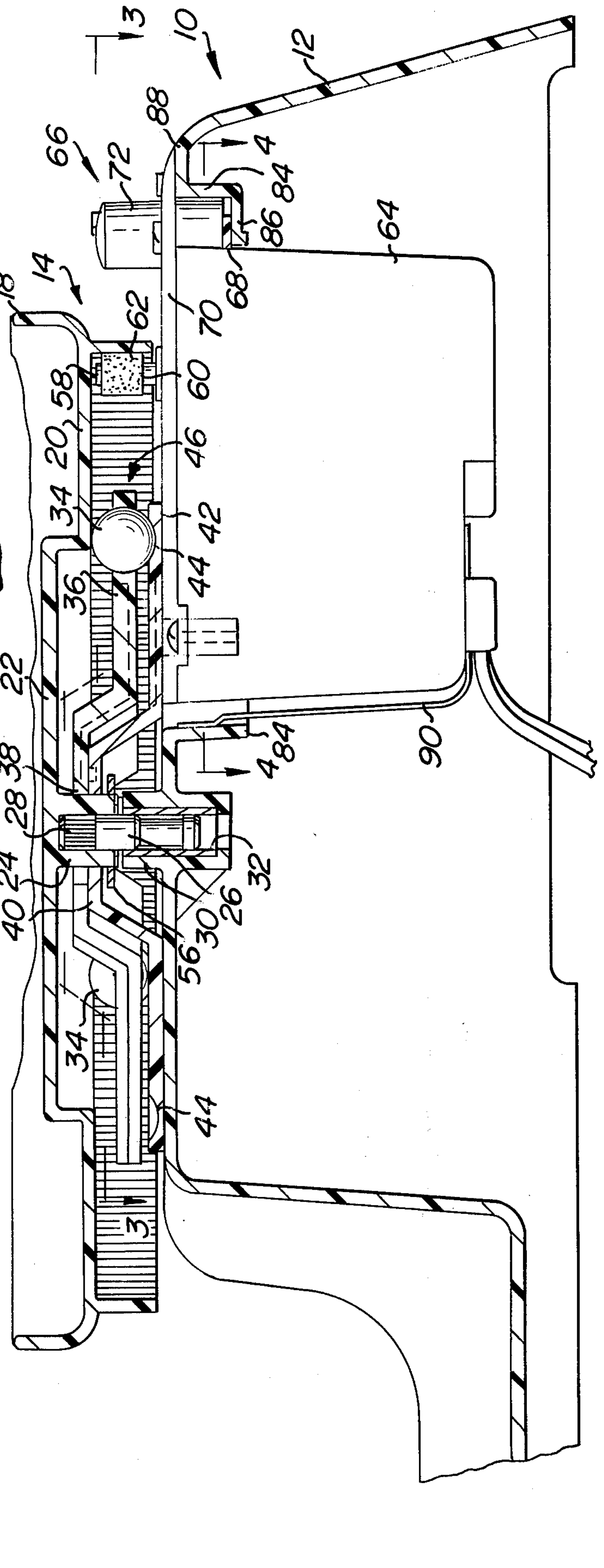
FIG. 2 is a cross-sectional view taken along the lines 2—2 in FIG. 1.

The turntable assembly 14 includes a turntable 18 which has an annular trough 20 for collecting scraps of work material or other debris, a circular central platform 22 for supporting a work of clay or other material, and a hub 24 depending from the central platform. See FIG. 2. The casing 12 and turntable 18 are preferably made of a lightweight material such as polystyrene. A spindle 26 provided with a knurled portion 28 is securely seated within the turntable hub 24. The turntable is rotatably mounted on a hub 30 in the top portion of casing 12. Spindle 26 is rotatably seated in sleeve bearing 32 inside casing hub 30. When the turntable 18 is driven rotatably as described hereinafter, the spindle 26 rotates about its longitudinal axis inside sleeve bearing 32.

The underside of turntable trough 20 rollably contacts a plurality of ball bearings 34 retained in spaced relation by a bearing holder 36. See FIG. 2. The bearing holder 36 is provided with a hub 38 having an opening through which turntable hub 24 extends. The bearing holder is supported beneath hub 38 by a hub 40 of a bearing race 42. Bearing race 42 is supported by casing 12 and is provided with an annular raceway 44 in which bearings 34 are rollably seated. The bearing race hub 40 is provided with an opening through which turntable hub 24 extends.

Ball bearings 34, bearing holder 36 and bearing race 42 comprise a bearing assembly 46. The bearing holder 36 and the bearing race 42 are preferably made of a lightweight material such as polystyrene. The ball bearings 34 are preferably made of polypropylene. The bearing assembly 46 is rotatably coupled to the turntable 18 by means of the ball bearings 34. The bearing assembly 46 and turntable 18 together comprise the turntable assembly 14. The bearing assembly 46 provides additional support for the turntable 18 along annular trough 20 and attenuates irregular motion of the turntable.

Figure 3:
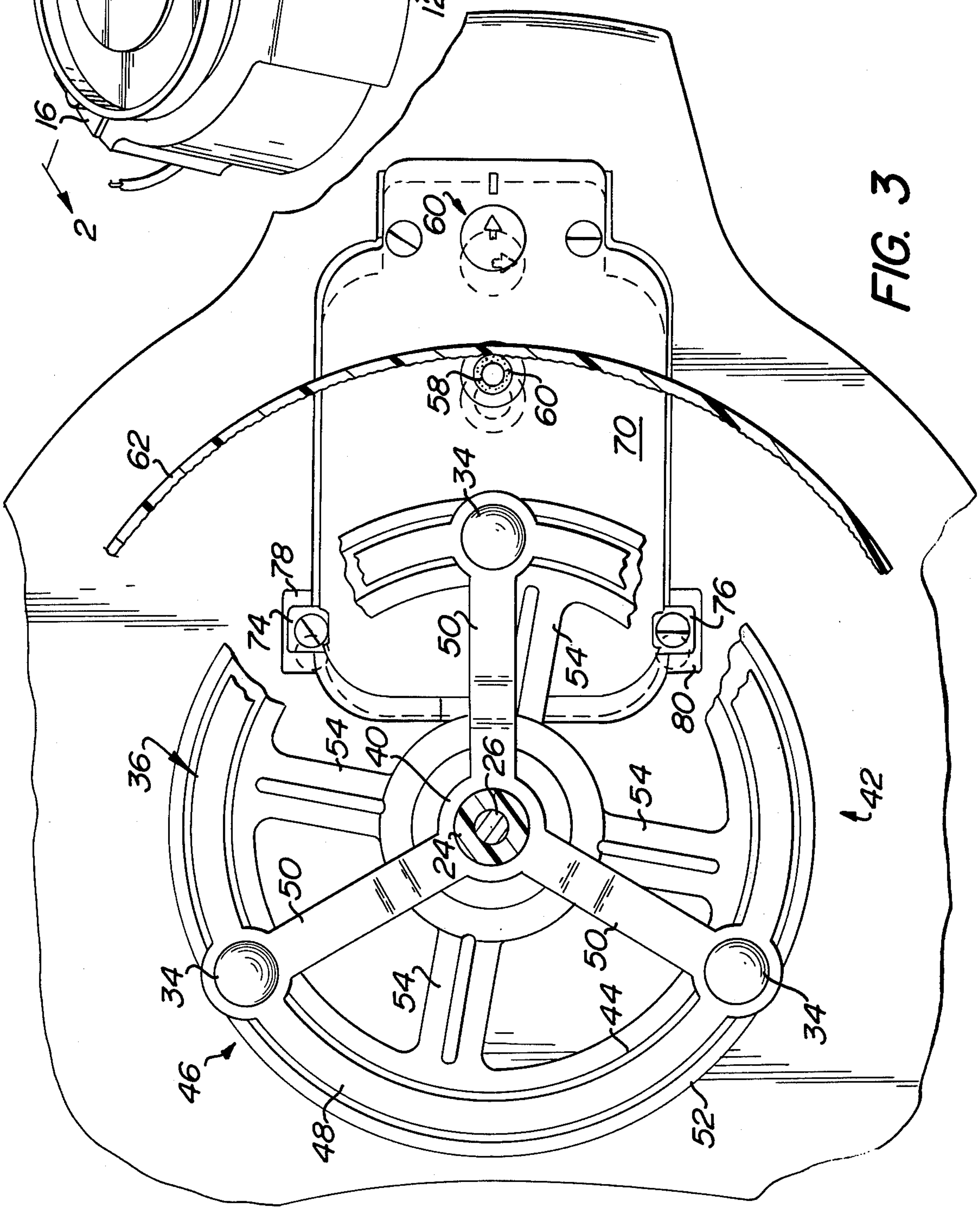
FIG. 3 is a top view taken along the lines 3—3 in FIG. 2.

The bearing assembly 46 is shown in greater detail in FIG. 3. Bearing holder 36 is provided with an annular body portion 48 which is connected to hub 40 by means of a plurality of arms 50. The ball bearings 34 are retained in a plurality of spaced circular openings in the annular body portion 48 of the bearing holder.

The bearing race 42 is disposed beneath bearing holder 36. Bearing race 42 is provided with an annular body portion 52 in which annular raceway 44 is formed. The annular body portion 52 of bearing race 42 is connected to hub 38 by means of a plurality of slotted arms 54. When turntable 18 is rotatably driven about the axis of spindle 26, the turntable causes ball bearings 34 to roll along raceway 44. Accordingly, bearing holder 36 rotates about the axis of spindle 28 while bearing race 42 remains stationary.

Turntable assembly 14, comprising the bearing assembly 46 and turntable 18, is removable as a single unit from casing 12. A circular retainer nut 56 is secured to turntable hub 24 for this purpose. See FIG. 2. The retainer nut 56 supports the bearing assembly, preventing it from dropping off hub 25 when the turntable assembly is removed as a unit from the casing.

In operation, the turntable 18 is rotatably driven by a motor shaft 58 having a drive sleeve 60. See FIG. 2. The drive sleeve 60 rollably contacts the interior surface of a peripheral rim 62 which depends from the annular trough 20 of turntable 18. The interior surface of peripheral rim 62 is knurled to avoid slippage between the drive sleeve 60 and the interior surface of the rim.

Figure 4:
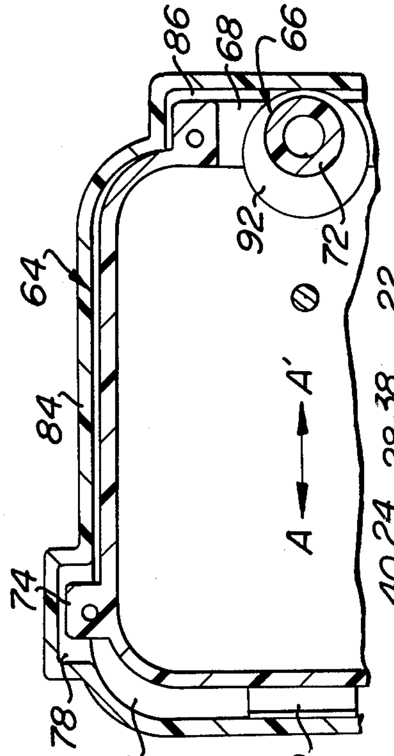
FIG. 4 is a top view taken along the lines 4—4 in FIG. 2.

A motor for driving the shaft 58 is secured to and sealed within a motor housing 64. The motor may be any conventional unit suitable for driving the turntable 18 as described. A cam member in the form of a knob 66 is seated on a shelf-like portion 68 of the motor housing. The motor housing is sealed by a cover plate 70 having an opening through which shaft 58 extends and an opening through which knob 66 extends. Knob 66 is provided wih a knurled portion 72 which permits the operator to easily grip and rotate the knob. The motor housing is also provided with flanged lug portions 74 and 76 which are seated on recessed shelves 78 and 80 respectively of a compartment 82 defined by casing wall 84. See FIGS. 3 and 4. The shelf-like portion 68 of housing 64 is seated on a flanged support element 86 connected to casing wall 84. See FIG. 2. The cover plate 70 extends beyond the casing wall 84 and rests on a peripheral top portion 88 of casing 12, preventing dirt or other foreign material from entering compartment 82.

The motor housing 64 is movable within compartment 82 in the directions indicated by arrows A and A′. See FIG. 4. In particular, when the motor housing 64 is displaced in the direction A, drive sleeve 60 is spaced apart from turntable rim 62 and the turntable can be manually operated as a lazy Susan. On the other hand, when the housing is displaced in the direction A′, drive sleeve 60 is brought into rollable engagement with the interior surface of the turntable rim and the turntable can be motor driven. The alternate displacement of the motor housing 64 and drive sleeve 60 in the directions A and A′ is shown more clearly in FIG. 3. The representation of the motor housing and drive sleeve shown in phantom corresponds to displacement in the direction A. The representation of the housing and drive sleeve shown in solid lines corresponds to displacement in the direction A′.

Displacement of the motor housing is accomplished by means of knob 66 and resilient means or leaf spring 90. See FIG. 2. Leaf spring 90 is secured to the bottom of motor housing 64 and extends upwardly therefrom to contact casing wall 84. Spring 90 presses against the casing wall to urge the motor housing 64 in the direction A′ to the position at which drive sleeve 60 rollably engages the interior surface of turntable rim 62. In this position, the drive sleeve 60 transmits power from the motor to the turntable, causing the turntable to rotate about the axis of spindle 26. The turntable rolls over the ball bearings 34 as it rotates in response to the motor.

To disengage drive sleeve 60 from contact with turntable rim 62, knob 66 is rotated approximately 90°, either clockwise or counterclockwise. The camming action of the knob against the surface of casing wall 84 causes the entire motor housing 64 to move in the direction A to a position at which the drive sleeve 60 is spaced apart from the turntable rim.

Preferably, knob 66 is a unitary component having a knurled portion 72 and a base portion 92. The camming action produced by rotation of knob 66 against casing wall 84 is due to the base portion 92 of the knob. See FIGS. 2 and 4. The top knurled portion 72 and the base portion 92 are generally cylindrical in shape. The central axes of the knurled portion 72 and base portion 92 are spaced apart so that rotation of the knob about the axis of the top knurled portion causes the base portion to slidingly engage casing wall 88 and urge the motor housing in the direction A by means of a camming action. The camming action produced by rotation of knob 66 opposes the urging force of leaf spring 90 and causes drive sleeve 60 to release from contact with turntable rim 62. When the knob 66 is rotated back to its original position, indicated in FIG. 4, the leaf spring 90 returns the motor housing 64 in the direction A′ until drive sleeve 60 contacts turntable rim 62.

It should be noted that, with drive sleeve 60 spaced apart from turntable rim 62, the turntable can be rotated manually as a lazy Susan to permit specific areas of a work mounted on the turntable to be examined. For instance, a partially finished work can be decorated at preselected areas by manually rotating the turntable and stopping it when access to the preselected area is obtained. Alternatively, a finished work can be displayed on the turntable by manually rotating the turntable at a slow rate.

In the preferred embodiment of the potter's wheel described herein, casing 12 includes a well 100 formed therein for storing articles such as tools for molding the work, cloths and so forth. The potter's wheel is light, compact and portable. The turntable assembly 14 and the motor housing 64 are separately removable from the casing 12. Each component can be separately washed or cleaned and transported and the components are dust and water resistant.

The present invention may be embodied in other specific forms without departing from the spirit or essential attributed thereof and, accordingly, reference should be made to the appended claims, rather than to the foregoing specification as indicating the scope of the invention.

I claim:

1. A potter's wheel, comprising:

a casing;

a turntable assembly removably mounted on said casing, said turntable assembly including a turntable having a peripheral rim, said turntable being rotatably mounted on said casing, and a bearing assembly disposed beneath said turntable, said turntable and said bearing assembly being coupled for removal from said casing as a unit, a motor housing and a motor mounted therein having a shaft provided with a drive sleeve, said shaft and drive sleeve projecting outwardly from said housing, said housing being removably mounted on said casing for reciprocating movement thereon; and means operatively associated with said motor housing and said casing for displacing said motor housing in a first direction to cause said drive sleeve to rollably engage said turntable peripheral rim and in a second direction to cause said drive sleeve to disengage said rim.

2. The potter's wheel according to claim 1 wherein said bearing assembly includes a bearing holder and a plurality of bearings retained therein, and a bearing race disposed beneath said bearing holder and supported by said casing, said bearings being rollably seated in said race and said turntable being rollably supported by said bearings.

3. The potter's wheel according to claim 1 wherein said displacing means includes resilient means disposed between and in contact with said motor housing and said casing to urge said housing in said first direction, and cam means rotatably mounted on said housing for slideably engaging said casing to cause said motor housing to travel in said second direction as a function of the rotation of said cam means.

4. The potter's wheel according to claim 3 wherein said cam means is a knob comprising upper and lower cylindrical portions having eccentric central axes, said knob being mounted on said housing for rotation about said upper portion central axis.

5. The potter's wheel according to claim 1 wherein said casing includes a well formed therein for storing articles.

6. A potter's wheel, comprising:

a casing having a top portion provided with a compartment;

a turntable unit removably mounted on said casing, said turntable unit including a turntable having a peripheral rim, said turntable being rotatably mounted on said casing, and a bearing assembly mounted on said casing, said bearing assembly being disposed beneath said turntable, said turntable and bearing assembly being coupled; and a motor housing and a motor mounted therein having a shaft provided with a drive sleeve projecting outwardly from said housing, said housing being removably mounted in said casing compartment for reciprocating movement therein; and means mounted on said motor housing for selectively producing movement of said housing to alternately cause said drive sleeve to rollably engage said turntable peripheral rim and disengage said rim.

7. The potter's wheel according to claim 6 wherein said bearing assembly includes a bearing holder having a plurality of holes spaced apart along the periphery thereof, a plurality of bearings disposed within said holes, and a bearing race disposed beneath said bearing holder and supported by said casing, said bearings being rollably seated in said race and said turntable being rollably supported by said bearings.

8. The potter's wheel according to claim 6 wherein said means for selectively producing movement of said motor housing includes a leaf spring secured to said housing, said leaf spring being adapted to contact said casing to urge said housing to a first position at which said drive sleeve contacts said turntable peripheral rim, and a cam member rotatably mounted on said housing for slidably engaging said casing to urge said housing to a second position at which said drive sleeve is spaced apart from said rim as a function of rotation of the cam member.

* * * * *